Dec. 3, 1963  A. M. HASE  3,113,257
CONTROL CIRCUIT FOR UNIDIRECTIONAL POWER SUPPLY
UTILIZING A MAGNETIC AMPLIFIER
Filed Aug. 15, 1960  2 Sheets-Sheet 1
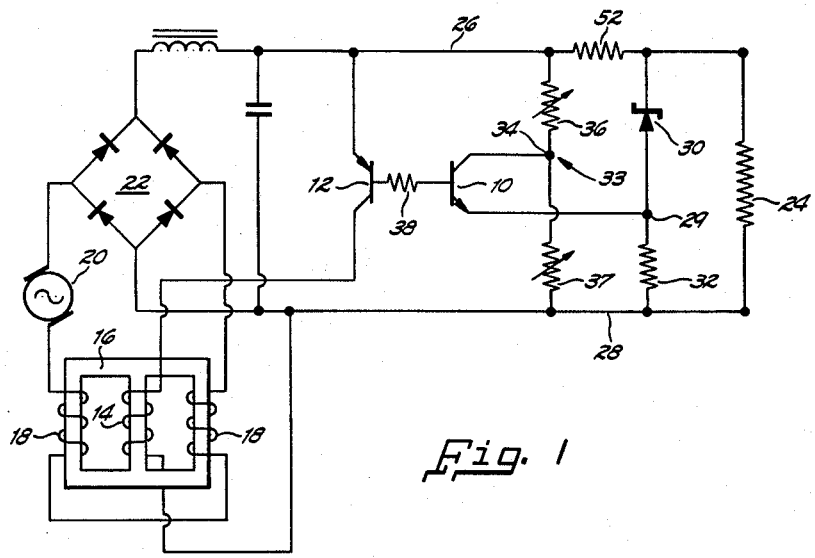
_Fig. 1_
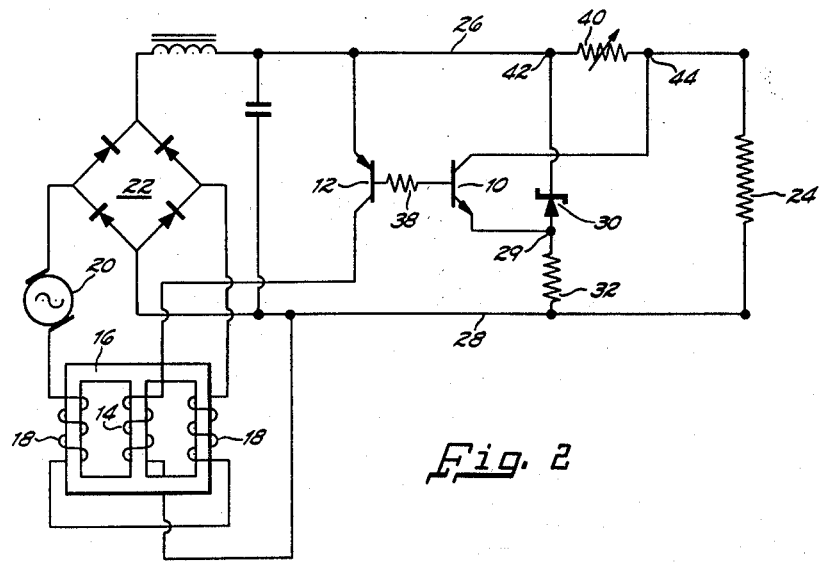
_Fig. 2_
INVENTOR.
Alfred M. Hase
BY
Fred Wiviott
Attorney INVENTOR.
Alfred M. Hase
BY
Fred Wiviott
Attorney

United States Patent Office 3,113,257
Patented Dec. 3, 1963

3,113,257
CONTROL CIRCUIT FOR UNIDIRECTIONAL POWER SUPPLY UTILIZING A MAGNETIC AMPLIFIER
Alfred Max Hase, Toronto, Ontario, Canada, assignor to McGraw-Edison Company, Milwaukee, Wis., a corporation of Delaware
Filed Aug. 15, 1960, Ser. No. 49,469
1 Claim. (Cl. 321—18)

This invention relates to control circuits and more particularly to circuits for controlling relatively large unidirectional currents and voltages.

Prior art control circuits were not entirely satisfactory for unidirectional power supplies having high power requirements, i.e., in the order of 50 kv. and above, because they require a plurality of amplifying stages in order to realize sufficient current gain for the control of such large magnitudes of power. A plurality of amplifying stages is not desirable, however, because each stage requires temperature compensation and introduces errors due to drift.

Certain prior art control circuits of the impedance type, wherein an impedance is placed in series or in shunt with the load to dissipate unwanted power, are not suitable for large power applications because they introduce sizable losses at full load and the energy dissipated at no load tends to generate substantial amounts of heat which may seriously damage certain of the circuit elements.

It is an object of the invention to provide a transistorized control circuit suitable for relatively large power applications.

It is another object of the invention to provide a relatively large unidirectional power supply apparatus with a control circuit which does not introduce appreciable losses at full load and which can effectively dissipate the no load energy without damage to the circuit elements.

It is a further object of the invention to provide a control circuit for unidirectional power supply utilizing a magnetic amplifier.

It is a still further object of the invention to provide a circuit for controlling a direct current supply wherein a magnetic amplifier is utilized with its control winding in circuit with a transistor amplifier and whose load windings are in series with the load.

Another object of the invention is to provide a control circuit for unidirectional power supplies wherein a minimum of amplifying stages are required.

It is yet another object of the invention to provide a control circuit for undirectional power supplies wherein a single stage accomplishes error detection as well as pre-amplification.

Still another object of the invention is to provide a control circuit for unidirectional power supplies which compensates for voltage regulation.

These and other objects and advantages of the invention will become apparent from the accompanying drawings in which:

FIG. 1 shows a voltage control circuit utilizing the instant invention;

FIG. 2 shows a current control circuit incorporating the instant invention; and

Figure 3:
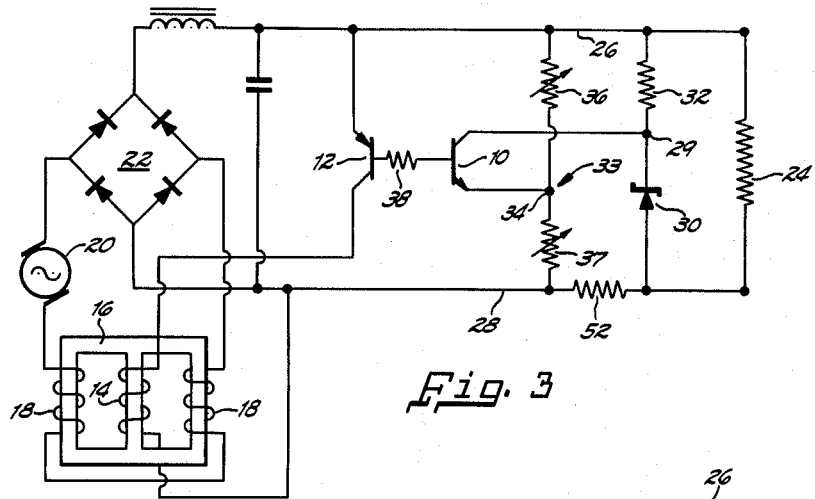
FIGS. 3–5 show modifications of the control circuit of FIG. 1.

In general terms the invention comprises a circuit for controlling the magnitude of an electrical quantity delivered from a variable source to a load and which includes a constant voltage source, means for deriving a voltage signal which varies in accordance with variations in said quantity and a transistor whose emitter-collector circuit is connected between said voltage source and said voltage means. In addition, control means is connected to said source and to the base of said transistor for controlling the magnitude of said quantity in accordance with variations in the base current.

According to a more specific aspect of the invention, this transistor base current is used to control a magnetic amplifier whose load windings are in circuit with a rectifier which supplies D.C. power to the load.

According to another specific aspect of the invention, the circuit includes positive feedback means to provide a positive feedback signal which is proportional to the load current to compensate for the voltage regulation of the system.

Referring now to the drawings in greater detail, FIG. 1 shows a voltage control circuit having a voltage comparing and pre-amplifying transistor 10, which compares a voltage signal that changes in accordance with changes in load voltage and a constant voltage source. An amplifying transistor 12 is coupled to the voltage comparison transistor 10 and is also in circuit with the control windings 14 of a magnetic amplifier 16 whose load windings 18 are disposed between a source of alternating current 20 and the input terminals of a full wave rectifier 22. The output terminals of rectifier 22 are connected to a load 24 by positive and negative supply conductors 26 and 28 respectively.

The constant voltage source comprises a Zener diode 30 whose negative terminal is directly connected to conductor 26 while its positive terminal is connected to conductor 28 through resistor 32. A voltage divider 33 which is connected across load 24 and comprises adjustable resistors 36 and 37 disposed on either side of a tap 34, provides a voltage signal that varies in accordance with changes in load voltages. The emitter of voltage comparison transistor 10 of FIG. 1 is connected to the junction point 29 between Zener diode 30 and resistor 32 while its collector is connected to the tap 34 between resistors 36 and 37.

The impedance of resistor 32 is chosen to provide sufficient current flow through Zener diode 30 to insure that the voltage drop across it remains substantially constant regardless of changes in said current. In this manner, the potential at junction point 29 is held to a fixed negative value relative to the positive supply conductor 26, which equals the constant Zener voltage of diode 30. In addition, because the current through resistor 36 of voltage divider 33 varies with changes in load current, the potential at tap 34 will also have some negative value with respect to conductor 26, which changes proportionally with changes in load voltage.

The base of transistor 12 is connected through voltage limiting resistor 38 to the base of transistor 10 while its emitter is directly connected to the positive supply conductor 26 and its collector is connected to the negative supply conductor 28 through the control winding 14 of magnetic amplifier 16. It can thus be seen that transistor 12 is connected as a grounded emitter amplifier whose input signal constitutes the transistor 10 base current. This input signal, therefore, controls the magnitude of the transistor 12 collector current which is also the control current for magnetic amplifier 16. Thus, variations in transistor 10 base current vary the current in the control winding 14 of magnetic amplifier 16 and, as a result, the magnitude of the current flowing through load windings 18.

Amplification and control is achieved in transistor 10 by operating it as an overdriven emitter-follower, that is, by selecting resistors 32, 36, 37 and 38 and diode 30 so that a higher potential exists on the base of transistor 10 than on either its emitter or collector. As a result, both the base-emitter and base-collector junctions are forward biased whereby emitter and collector currents in transistor 10 are drawn through it base from the positive conductor 26, through the emitter and base of transistor 12. Since this transistor 10 base current exceeds its emitter current the potential at junction point 29 can be made equal to the potential at junction point 33. Hence, because the voltage drop across the emitter-base junction of transistor 12 and resistor 38 is less than that across resistor 36, the square wave of the collector voltage of transistor 12 resulting from the firing of magnetic amplifier 16, and which appears on the base of transistor 10, will exceed that on junction 34 so that a square wave voltage will appear on junction 29 that just equals that on junction 34.

It will be appreciated that when the voltage across load 24 increases from the predetermined desired value the voltage drops across resistors 32, 36 and 37 will increase while the drop across Zener diode 30 will remain constant. As a result, the potential on junction point 34 becomes more negative with respect to conductor 26 while the relative potential on junction point 29 remains constant. This in turn raises the collector-emitter voltage of transistor 10 which reduces its base-collector bias, and hence, its pulsating base current. In this manner an increase in the load 24 voltage from a predetermined value, decreases the transistor 12 base current.

This decline in the transistor 12 base current is reflected as a reduction in its collector current and hence in the current flowing to the control winding 14 of magnetic amplifier 16. As the current in control winding 14 decreases the degree of saturation in magnetic amplifier 16 will also decrease thereby increasing the reactance of load windings 18. Upon this event, the voltage supplied from rectifier 22 to load 24 decreases so that the voltage drop across resistors 32, 36 and 37 begins decreasing. During the latter event, the base collector bias of transistor 10 begins increasing the base current of transistors 10 and 12 whereupon the current in control winding 14 also increases so that the reactance of load windings 18 will begin decreasing. This will continue until the voltage across load 24 reaches the preselected value whereupon the circuit again becomes stable.

On the other hand, should the voltage across load 24 decrease from the preselected value, the voltage drop across resistors 32, 36 and 37 will decrease so that the base collector bias across transistor 10 increases. This increases the transistor 10 base current which is amplified by transistor 12 to increase the current in the control winding 14 of magnetic amplifier 16, whereupon the impedance of load winding 18 decreases. As a result, the voltage supplied to load 24 will increase until it again reaches the preselected value whereupon the system will again be in equilibrium.

It has been found that with the connections of transistor 10 illustrated in FIG. 1, wherein it is operated as an overdriven emitter follower with the input signal placed between the emitter and collector and the output signal is taken off the base, amplification in the order of 10 to 50 can be achieved. It will be appreciated, therefore, that not only does transistor 10 perform the function of sensing changes in load voltage from a preselected value but that it also performs the additional function of amplifying this error signal. As a result, the need for a preamplifying stake is eliminated.

It will also be appreciated that even though the load windings 18 are in series with load 24, full load losses can be held to a relatively small value if the magnetic amplifier 18 is near its saturation point when operating at high load values. In addition, when the control circuit is being operated at no load, the load windings 18 dissipate the input energy with a minimum of heating. In this regard also, magnetic amplifier 16 can be conveniently located and cooled in such a manner that the other components of the system will not be adversely affected by such heating.

In voltage control circuits of the general type illustrated in FIGS. 1, 3, 4 and 5, the voltage regulation of the system, that is the decrease in output voltage between zero and full load, can be appreciable. This regulation is, of course, a function of load current. In order to compensate for this regulation, a positive feedback current resistor 52 is used in series between the source and the load 24. When the positive terminal of Zener diode 30 is directly connected to the positive supply conductor 26 as shown in FIG. 1, resistor 52 is connected in conductor 26 between the positive terminals of diode 30 and resistor 36. On the other hand, when the Zener diode 30 is connected in the manner illustrated in FIG. 3, resistor 52 is connected in the negative supply conductor 28 between the negative terminals of Zener diode 30 and resistor 37. Referring specifically to FIG. 1, it can be seen that the voltage drop across resistor 52 will lower the potential of the positive terminal of Zener diode 30 relative to the positive terminal of resistor 36 by an amount proportional to the load current. This feedback voltage, therefore, increases the difference in potential between the emitter and collector of transistor 50 over the normal error signal by an amount proportional to the load current. As a result, the output signal on the base of transistor 50 will have a normal component which is a function of the load voltage and an additional component which is a function of the load current. The voltage at the output terminals of rectifier 22 will therefore also include an additional component that is a function of the load current. By properly proportioning resistor 52 this additional output voltage can be made equal to the voltage drop in the system resulting from its voltage regulation so that the voltage at the terminals of load 24 will be unaffected by variations in load current. In other words, the system would then have zero voltage regulation. It can be seen that because the additional output signal and the voltage loss due to the system's normal voltage regulation are both a function of load current, the effect of this normal regulation can be compensated for over the whole range of load currents. If desired resistor 52 can be adjusted to give any degree of positive or negative voltage regulation in addition to the zero voltage regulation just discussed. The magnitude of the resistance 52 necessary to accomplish this function is quite small so that it introduces only relatively minor losses.

FIG. 2 illustrates an alternate embodiment of the invention in which the control circuit is utilized to control the current delivered to load 24. Here, deviations in load current from a preselected value are sensed by comparing the voltage drop across a series connected resistor with a constant voltage source. The circuit of FIG. 2 is the same as that shown in FIG. 1 except that an adjustable resistor 40 in series with load 24 replaces the shunt connected voltage divider. More specifically, resistor 40 is connected between the positive terminal 42 of rectifier 22 and the positive terminal of load 24 while the collector of transistor 10 is connected to the negative terminal 44 of resistor 40. Resistor 40 is so adjusted relative to Zener diode 30, that when a preselected current flows to load 24, the potential at junction point 44 will have a predetermined value with respect to junction point 29 so that transistor 10 will operate as an overdriven emitter follower.

Should the load current increase from this value, the transistor 10 base current would be decreased in the manner discussed with respect to the circuit of FIG. 1 so that the amplified signal in the collector of transistor 12, and hence, in the control winding 14 of magnetic amplifier 16, is correspondingly decreased. In this manner, the impedance of the load windings 18 are increased whereby the output current from rectifier 22 is decreased. When the current in load 24 again reaches the preselected value, the control circuit will again be in equilibrium. On the other hand, should the load current decrease from the preselected value, the output current from rectifier 22 would in increase in a similar manner.

FIG. 3 is a modification of the circuit shown in FIG. 1 and illustrates that the transistor 10 emitter and collector connections can be reversed by reversing the relative positions of Zener diode 30 and resistor 32. Here the negative terminal of Zener diode 30 is connected to negative conductor 28 while its positive terminal is connected to positive conductor 26 through resistor 32. Also, the emitter and collector of transistor 10 are now connected to tap 34 and junction point 29 respectively. The operation of this circuit is similar to that shown in FIG. 1. If the load voltage increases from its preselected value, the voltage drop across resistor 37 increases so that the potential on junction point 34 becomes more positive with respect to conductor 28, while the voltage drop across Zener diode 30, of course, remains constant. Thus, the emitter-collector potential of transistor 10 increases to effect voltage control in the manner previously discussed with respect to FIG. 1.

Figure 4:
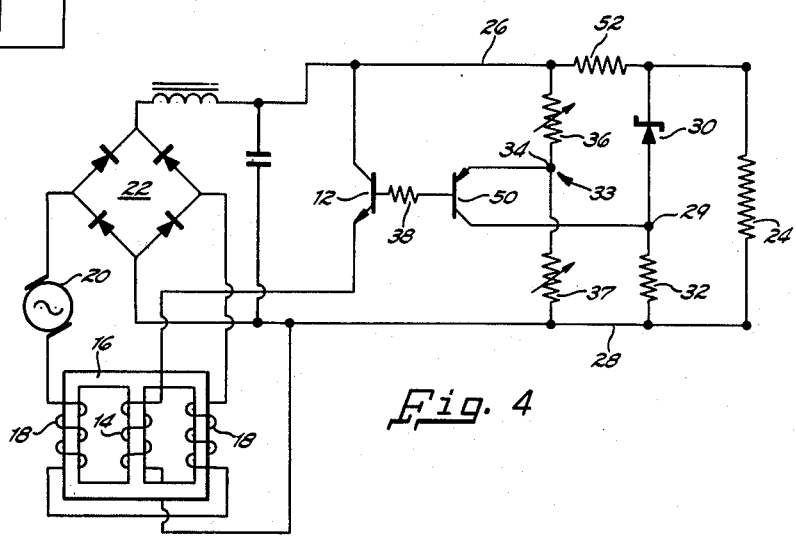

FIG. 4 illustrates how a PNP type transistor 50 can be utilized to sense and pre-amplify load voltage variations instead of the NPN type transistor shown in FIG. 1. In this embodiment, the emitter of transistor 50 is connected to tap 34 while its collector is connected to junction point 29.

Figure 5:
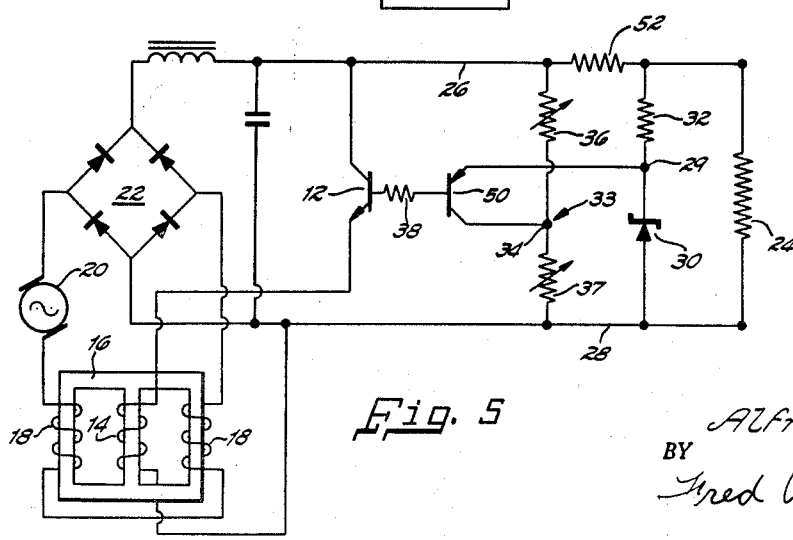

FIG. 5 illustrates how the embodiment of FIG. 3 can be modified by using a PNP type transistor 50. Here the collector of transistor 50 is connected to tap 34 and its emitter is connected to junction point 29. The operation of the circuits of FIGS. 4 and 5 are identical with those of FIGS. 1 and 3 save for the reversal of polarity of the transistors.

It will be noted in each of the figures that where transistor 10 or 50 is of the NPN type, the amplifying transistor 12 is of the PNP type and vice versa.

It will be understood by those skilled in the art that modifications similar to those shown in FIGS. 3, 4 and 5 are also possible with the current control circuit of FIG. 2 but for the sake of brevity these will not be discussed in detail.

While only a few embodiments of the instant invention have been shown and described other modifications thereof will be apparent to those skilled in the art once applicant's inventive concept is known. Accordingly, it is intended in the appended claim to cover all modifications that fall within the true spirit of the invention.

I claim:

An electric circuit for controlling the magnitude of an electrical quantity, an alternating current source, rectifying means having an input connected to said source and an output load, terminal means, reference voltage means connected across said load terminal means and including a series connected constant breakdown potential diode and a resistor, resistance means in circuit with said load terminal means for producing a voltage signal that varies in accordance with changes in said electrical quantity, a first transistor having its emitter-collector circuit connected to said diode and to said resistance means, control means including a second transistor having its base connected to the base of said first transistor and a magnetic amplifier having control winding means and load winding means, said load winding means being in circuit between said alternating current means and said rectifier, the emitter and collector of said second transistor being serially connected to said control winding and the combination shunting the output of said rectifier, said first and second transistors being normally nonconductive so that said load winding means presents a high impedance to said alternating current source, said second transistor becoming conductive and said first transistor becoming operative as an overdriven emitter amplifier when the voltage at the output of said rectifier exceeds a predetermined quantity so that said load windings present a low impedance to said current source, whereby said transistors are conductive for only a portion of the rectified voltage wave appearing at the output of said rectifying means.

References Cited in the file of this patent

UNITED STATES PATENTS

| | | |
|---|---|---|
| 2,751,545 | Chase | June 19, 1956 |
| 2,903,639 | Meszaros | Sept. 8, 1959 |
| 2,932,783 | Mohler | Apr. 12, 1960 |
| 2,937,328 | Huge et al. | May 17, 1960 |

FOREIGN PATENTS

| | | |
|---|---|---|
| 1,179,359 | France | May 22, 1959 |

OTHER REFERENCES

"Principles of Transistor Circuits," Richard H. Shea, December 1957.